United States Patent [19]

Gilby et al.

[11] Patent Number: 4,521,684
[45] Date of Patent: Jun. 4, 1985

[54] OPTICAL MEASUREMENT SYSTEM WITH LIGHT-DRIVEN VIBRATING SENSOR ELEMENT

[75] Inventors: Anthony C. Gilby, Foxboro; Edward L. Lewis, Sharon; Everett O. Olsen, Wrentham, all of Mass.

[73] Assignee: The Foxboro Company, Foxboro, Mass.

[21] Appl. No.: 350,687

[22] Filed: Feb. 22, 1982

[51] Int. Cl.³ .............................................. G02B 5/14
[52] U.S. Cl. .............................. 250/227; 250/231 R; 73/862.59
[58] Field of Search ................... 250/227, 551, 231 R; 455/605, 606, 607, 610, 612; 73/704, 705, 708, 717, 862.59, 653, 702

[56] References Cited

U.S. PATENT DOCUMENTS

| | | | |
|---|---|---|---|
| 4,071,753 | 1/1978 | Fulenwider et al. | 250/227 |
| 4,345,482 | 8/1982 | Adolfsson et al. | 73/702 |
| 4,346,478 | 8/1982 | Sichling | 250/227 |
| 4,356,396 | 10/1982 | Ruell et al. | 250/227 |
| 4,372,164 | 2/1983 | Brown et al. | 73/704 |
| 4,379,226 | 4/1983 | Sichling et al. | 73/704 |
| 4,417,140 | 11/1983 | Adolfsson et al. | 250/227 |

FOREIGN PATENT DOCUMENTS

| | | |
|---|---|---|
| 41688 | 12/1981 | European Pat. Off. |
| 2945019 | 5/1980 | Fed. Rep. of Germany. |
| 1480702 | 7/1977 | United Kingdom. |

OTHER PUBLICATIONS

Control and Instrumentation, vol. 13, No. 3, Mar. 1981, pp. 45, 47, J. Brotton: "Remote Sensing Could Emerge as a Major Role for Fiber Optics".

*Primary Examiner*—David C. Nelms
*Attorney, Agent, or Firm*—Jack H. Wu; Terrence Martin; William E. Meyer

[57] ABSTRACT

An instrumentation system for use in measuring and processing industrial process variables, such as flow, pressure, or temperature, includes a resonant element sensor whose resonant frequency varies in accordance with changes in the desired process variable communicating through an optical fiber link to a distant control room. The sensor is activated into resonant physical motion by light energy from a source in the control room, while the motion of the wire is sensed optically and retransmitted to the control room to produce an output signal whose frequency is equal to that of the resonating element. A feedback network maintains the sensor in resonance by synchronizing the delivery of light energy to the motion of the resonant element. The powering and sensing aspect may be performed by individual fiber optic cables or alternatively this function may be combined by utilizing a single fiber optic strand.

9 Claims, 2 Drawing Figures

OPTICAL MEASUREMENT SYSTEM WITH LIGHT-DRIVEN VIBRATING SENSOR ELEMENT

FIELD OF THE INVENTION

This invention relates to improvements in industrial process measurement apparatus capable of developing a signal that corresponds to the magnitude of a measurable physical parameter. More particularly, this invention relates to such apparatus employing resonant element sensors with fiber optic means to excite the resonant element and sense the resonant frequency.

BACKGROUND OF THE INVENTION

Instrumentation systems for use in measuring industrial process variables such as flow, pressure, temperature, and liquid level typically employ a sensing element located in a field location adjacent the process which responds directly to the process variable. The output signal of the sensing element is transmitted to a distant central station, e.g., a control room, for further signal conditioning and processing. In the majority of present industrial applications, an electrical measurement signal is produced at the sensor, and a two-wire transmission line provides the interconnection necessary to power the sensor and receive the measurement signal.

One class of measurement instrument for developing such a measurement signal that has been known for many years employs resonant elements as the primary sensing device. More recently an accurate, practical family of instruments of this general type has been devised and successfully marketed by The Foxboro Company as its 800-Series resonant wire sensors. While these devices represent a significant advance as evidenced by the high degree of commercial success which they have obtained, they do possess certain limitations, particularly when operating in severe, highly electrically noisy process environments.

Thus, room for improvement exists in the design and construction of industrial measurement instruments, especially in their accuracy while operating within troublesome process environments, by eliminating or minimizing undesired electrical effects.

SUMMARY OF THE INVENTION

The present invention provides a significant departure from those industrial measurement instruments of the past by providing an optical link between a resonant sensing element adjacent the process and a distant central station containing signal conditioning electronics. Energy necessary to activate the sensing element and induce mechanical vibration is thus supplied optically.

In a preferred embodiment to be described in detail below, a differential pressure measurement instrument of the resonant-wire type is linked to a control room by optical fiber means. One fiber transmits pulsed optical energy to activate the resonant-wire sensor, whose tension and hence resonant frequency varies in accordance with the pressure to be measured, while a second fiber sends an information-bearing signal back to the control room representative of the pressure measurement. The transmitted pulsed optical energy is photovoltaically converted into corresponding pulses of electric current which induce the wire, in the presence of a magnetic field, to vibrate at its resonant frequency. The other fiber senses oscillatory movement of the wire by reflecting transmitted steady-state light, which illuminates the moving wire, back into the fiber, thereby modulating the intensity of the steady-state light at a frequency that corresponds to the resonant frequency of the wire. To maintain the wire in resonance and thus minimize the amount of power required to drive the wire, a feedback network couples this composite reflected light signal to the supply of pulses to provide synchronization at the resonant frequency.

Alternatively, the fiber optic link between the process sensor and the control room may be achieved with a single fiber. This preferably involves the use of wavelength multiplexing onto the single fiber to provide the function of powering the resonant-wire sensor and detecting its frequency of vibration.

Other aspects and advantages of the present invention will become more evident after a review of the following detailed description taken in context with the accompanying drawings illustrating the principles of the invention.

DESCRIPTION OF THE PREFERRED EMBODIMENT

As used throughout this written description and in the appended claims, the term "resonant element" is to be construed broadly. That is, it is intended to encompass not only vibrating wires or strings but also any characteristic structure that, when subjected to an external stimulus such as a pressure or force, will vibrate at a frequency which corresponds to the applied stimulus.

Figure 1:
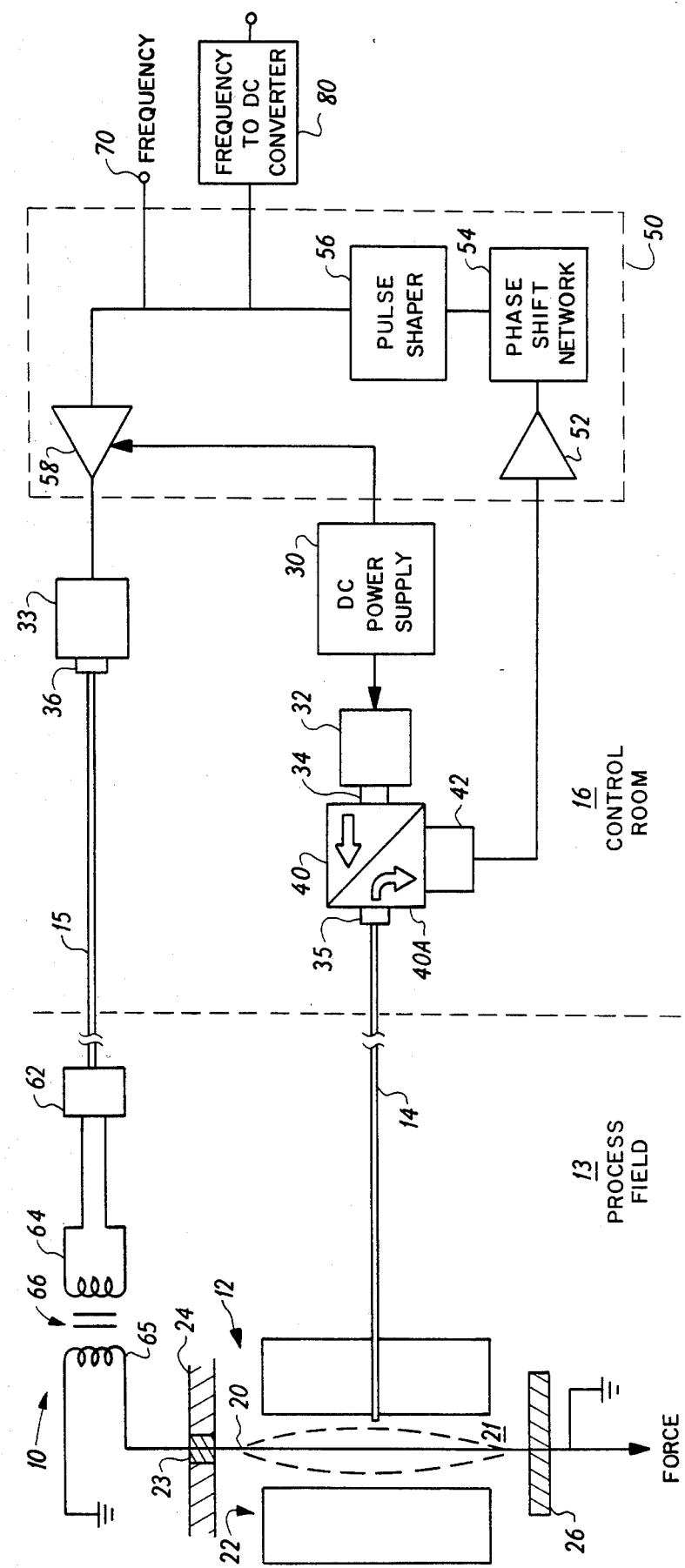
FIG. 1 is a schematic diagram in block format of a field-located differential pressure measurement device communicating with signal processing elements within a control room constructed in accordance with a preferred embodiment of the invention.

Turning now to FIG. 1, there is shown schematically a measuring instrument 10 employing a resonant element sensor 12 arranged to measure the magnitude of an unknown force (or pressure). The instrument is located in a process field 13 and is coupled by a pair of optical fibers 14, 15 to a central control room 16 having signal generating and processing equipment located therein. Although shown schematically as two distinct fiber optic cables, it will be appreciated that for typical process installations where the distance between field instruments and the control room is about one mile, these two fibers may be jacketed in a single cable with appropriate cladding to propagate the light.

The left-hand portion of FIG. 1 shows in block diagram format the mechanical components of the resonant element sensor 12, namely a wire 20 tautly positioned within the gap 21 of a magnetic assembly. This assembly consists of a permanent magnet and suitable pole pieces (collectively indicated by numeral 22) arranged to produce an intense magnetic field perpendicular to the longitudinal axis of the wire.

Although the operation of resonant element sensors is well understood by those of skill in the art, the following discussion represents a brief summary. The wire 20 is anchored at one end to a section of the instrument body indicated by numeral 24, while the other end is operatively coupled to a diaphragm 26 which alters the tension on the wire in response to an applied force. While the exact arrangement of components is not important for an understanding of the principles of the present invention, the pressure measuring instrument for this embodiment is that disclosed in U.S. Pat. No. 4,165,651, whose disclosure is hereby incorporated by reference. The wire is formed of electrically conductive material preferably with a polished reflective surface, and is electrically insulated from the instrument body by a bushing 23. When an alternating electric current is caused to flow through the wire, it is induced to vibrate at its resonant frequency which in turn is a function of the applied pressure. For purposes of illustration, it is assumed that the magnetic field is directed through the wire orthogonally to the plane of the drawing sheet, and thus the wire displacement follows the profile given by the dashed lines. A vibrating cycle is defined as a single excursion of the wire from its at rest or central null position to the left-most displacement back through the null position to its right-most displacement and back to the null position.

As shown the fiber 14 extends through a hole in the magnet assembly 22 to a position proximate the expected maximum deflection of the wire 20. This configuration permits the wire to be irradiated with light while a portion, depending on the instantaneous distance of the wire from the fiber, is reflected back into the fiber for transmission to the control room 16.

In operation, the electro-optical circuitry within the control room 16 provides the system drive energy through a regulated d-c power supply 30 that delivers a voltage input to a light emitting diode (LED) 32 and a feedback network 50 which in turn powers a second LED 33. The LED 32 provides, in conjuction with a pair of microlenses 34, 35 and a beam splitter 40, steady-state light into the fiber 14 for transmission to the wire 20. The use of microlenses at optical interfaces throughout the system to enhance optical energy transfer is well understood by those of skill in the art and such lenses are commercially available from Nippon Sheet Glass Company.

As mentioned, motion of the wire 20 results in a modulated light signal being reflected back to the control room 16 over the same optical fiber 14 where it is received at a photodiode 42 located at the return output 40A of the beam splitter 40. The electrical feedback network 50 coupled between the photodiode 42 and the LED 33 provides, through a microlens 36, light energy for the optical fiber 15 to activate motion of the wire 20. For this embodiment being described, a transformation of light energy into mechanical motion occurs at the field mounted end of the fiber 15 by a photodiode 62 whose electrical output is applied across the primary winding 64 of a transformer 66. The secondary winding 65 is directly connected to the wire 20.

It will be appreciated that this overall arrangement, although involving a mixture of electrical, mechanical and optical components, defines a closed loop oscillator. Moreover, as is well known by those of skill in the art, the system can be designed utilizing appropriate gain and phase shift selection to self-start from the electrical noise present or even from slight mechanical vibrations induced within the resonant-wire sensor 12 such that the loop will be at resonance within a few operating cycles.

Considering in more detail the operation of the system, and assuming that the wire 20 has begun vibrating, an a-c electrical signal will be developed at the photodiode 42 whose frequency is equal to that of the vibrating wire. This a-c signal is then applied to the feedback network 50. This network consists of a low-level a-c amplifier 52 to amplify the signal from the photodiode 42, a phase shift network 54 to compensate for phase differences within the closed loop to sustain oscillation, a pulse shaper 56, and a power amplifier 58. The output of the amplifier 58 becomes the drive voltage for the LED 33 which is thereby caused to emit a series of pulses of light. These light pulses, transmitted via the optical fiber 15 to the photodiode 62, produce (after suitable impedance matching by the transformer 66) corresponding current pulses through the wire that are precisely synchronized with the motion of the wire to produce maximum deflection (and hence a maximum amplitude resonant signal) with each successive pulse. Thus the output of the pulse shaper 56 represents the resonant frequency of vibration and hence the pressure measurement. This frequency signal may be read out directly at an output terminal 70 or alternatively supplied to a frequency to d-c converter 80 to produce a d-c control signal proportional to the pressure measurement.

In similar fashion changes to the resonant frequency of vibration caused by changes in pressure exerted on the diaphragm 26 are detected and automatically adjusted for within the closed loop to produce a new output signal representative of the change in the process parameters. The design details of an appropriate amplifier circuit described above are well within the knowledge of a skilled artisan.

Figure 2:
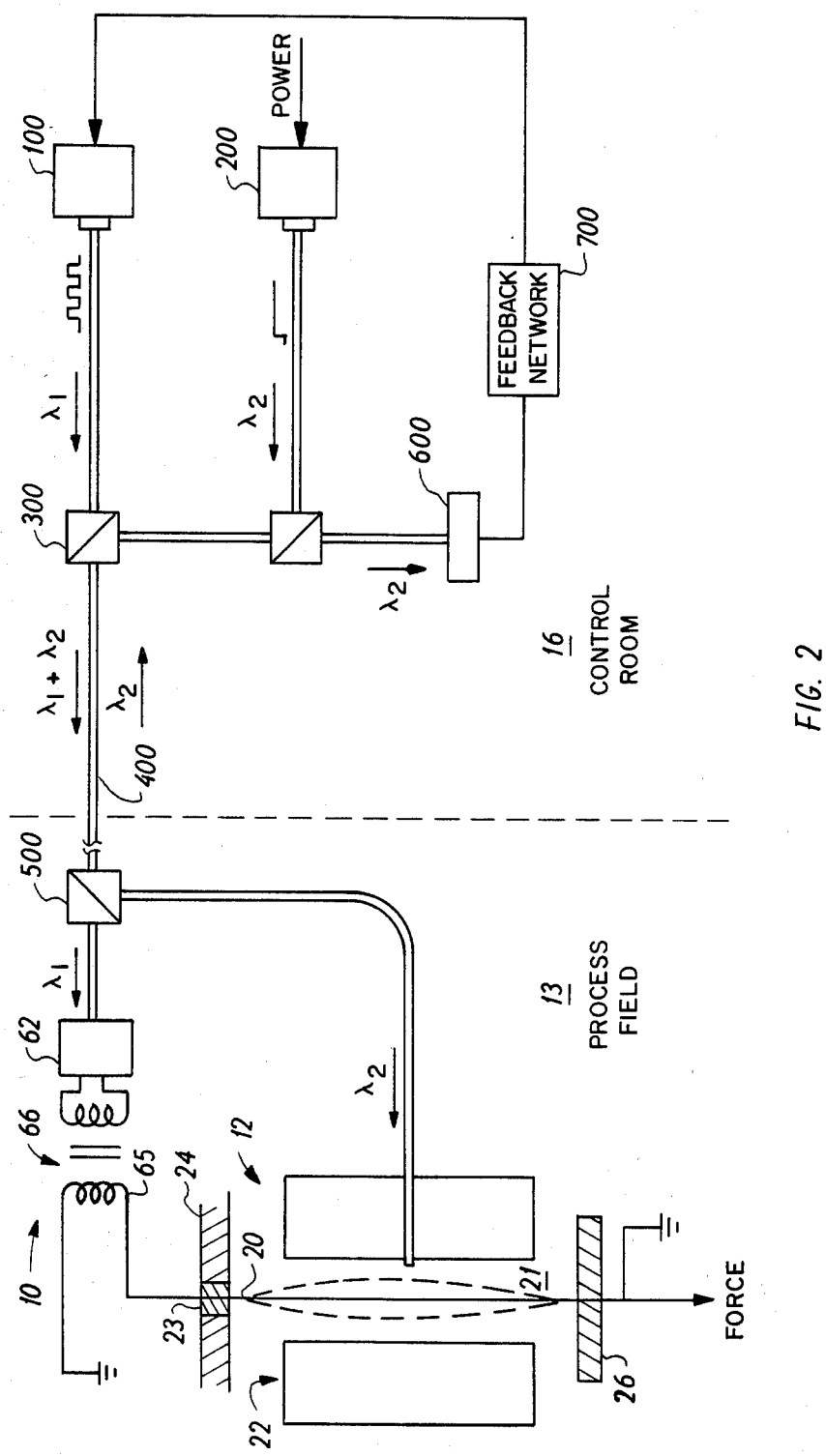
FIG. 2 is a schematic diagram showing the optical communications network employing a single fiber for transmitting power to and sensing the output of the pressure measurement device of FIG. 1.

In certain applications it may be desirous to provide a single optical fiber from communication between the process field and the control room. For these purposes, the arrangement of FIG. 2 (which focuses primarily on the optical energy transfer of the present invention) may be particularly advantageous. For simplicity, details of the electronic drive and feedback circuitry have been omitted, suffice it to say their operation will be similar to that already presented in detail above. Here a pair of LED sources 100, 200 of discernibly different wavelength ($\lambda_1$, $\lambda_2$) are wavelength multiplexed at a dichroic beam splitter 300. The source 100 produces a pulse train of light at a frequency within the operative range (e.g., 1700–3000 Hz) of the resonant sensor 10 while the source 200 provides a steady-state beam of light. These two wavelengths are transported from the control room 16 over a single optical fiber 400 to a field-located dichroic beam splitter 500 which passes substantially all of $\lambda_1$ to the photodiode 62 for powering the sensor 10 while blocking $\lambda_2$. In turn, effectively all of the steady-state light ($\lambda_2$) is reflected by the beam splitter 500 so as to illuminate the wire 20, with essentially none of $\lambda_1$ being directed along this path.

The return signal reflected from the wire 20 is as before the steady-state beam ($\lambda_2$) modulated in intensity by an alternating signal corresponding to the motion of the wire. This signal is then detected at a photodiode 600 and fed back through a suitable network 700 to close the loop with the LED source 100 thereby setting the pulse train frequency at the resonant frequency of the wire.

It may also be possible to utilize a single optical communication fiber to both power the sensor and detect its output without employing multiple sources and dichroic beam splitters. In such an arrangement, a pulsed beam of light is transmitted to the field and split in two paths, one to drive the wire, the other to illuminate the moving wire on a periodic basis. Although the waveforms of the reflected signal would be somewhat complicated due to the chopped nature of the incident light, the intensity of light reflected from the resonant wire would still be proportional to the distance between the wire and the adjacent optical fiber, with less light being reflected when the wire is furthest from the fiber and vice-versa. The returned illumination combined with the transmitted light produces a composite waveform representing the total illumination in a given instant of time within the optical fiber, i.e., a pulsed signal with a periodic alternating signal thereon. With suitable adjustments in the electronic design, a compatible oscillator could be built such that at resonance the transmitted light pulses would be synchronized with the motion of the wire. Such source synchronization is arrived at by the feedback arrangement previously discussed in detail above.

Thus numerous advantages of the present invention have been set forth in detail above. An instrumentation system employing a resonant element sensor has been demonstrated that operates by converting light energy into resonant physical motion, while transmitting measurement data in terms of frequency through optical sensing means. By eliminating electrical transmission between control room and field locations over copper wire conductors, problems associated with electromagnetic interferences as in past such systems have been alleviated. Installation of the present optical network within process plants may be simplified by eliminating the need for separate optical fiber conductors for powering and sensing by effectively providing two-way communication over a single optical fiber. Additionally, the feedback technique of the present invention besides sustaining oscillations also allows the largest amplitude of vibration for the lowest possible power input. This arrangement thus is particularly suitable to permit the use of low power LED sources for communicating over the distances involved while still maintaining an effective signal to noise ratio.

Although a preferred embodiment of the invention has been described in detail above, this is solely for the purpose of illustration and is not intended to be limiting. Numerous modifications will become apparent to those of skill in the art. For example, the invention has been described throughout as operating with resonant element sensors that are activated by electro-magnetic energy and hence a conversion from light energy to electrical energy has been shown. It will be understood that other techniques could be devised for applying the supplied light energy to the sensor element to effect resonant physical motion without departing from the scope of the invention as defined in the accompanying claims.

What is claimed is:

1. In an instrumentation system of the type wherein a physical parameter or measurand is to be measured at a sensor site by a sensor having therein an oscillator which includes an electromagnetically driven oscillating resonant element, the resonant frequency of vibration of which is responsive to and related to the measurand, said sensor being located at the measurement site, apparatus for powering oscillation of said sensor and determining said resonant frequency by fiber optic means comprising:

(a) first transducer means located at the sensor site for conversion of radiant energy to electrical energy required for powering the electromagnetically driven oscillating element of the sensor;

(b) radiant energy reflection means associated with the oscillating element for reflecting radiant energy;

(c) variable-power radiant energy source means for powering the oscillating resonant element;

(d) steady power radiant energy source means for providing radiant energy as an optical sense signal;

(e) at least one fiber optic pathway means for conveying the variable power radiant energy to the first transducer means and for conveying steady radiant energy to a point adjacent the reflection means associated with the oscillating element such that portions of the steady radiant energy optical sense signal are periodically reflected at said oscillating element vibrating frequency by said reflection means back along said at least one fiber optic pathway means;

(f) radiant energy level control means for regulating the variable-power radiant energy source output energy level over time in response to the reflected optical sense signal received by the radiant energy level control means.

2. The apparatus of claim 1 wherein said variable-power radiant energy source means produces a series of regularly recurrent impulses of radiant energy of similar characteristics.

3. The apparatus of claim 1 wherein said radiant energy level control means includes:

(a) second radiant energy to electrical power transducer means for producing an electrical power signal of varying level responsive to the periodically reflected radiant energy;

(b) a phase shift network for receiving said electrical power signal and adjusting the phase thereof to compensate for phase differences between said signal and the required first transducer output; and (c) amplifier means connected to the phase shift network for producing an output signal directed to sustaining the resonant frequency element oscillations.

4. The apparatus of claim 3 wherein the amplifier output is an electrical signal.

5. The apparatus of claim 3 further including transducer means connected to the amplifier output for producing said variable power radiant energy signal.

6. The apparatus of claim 1 wherein the fiber optic pathway means is a single optical fiber having first and second ends, and is further characterized in that the variable-power radiant energy source means produces a series of regularly recurrent impulses of radiant energy of a first wavelength lambda$_1$, the steady power radiant energy source means produces a substantially steady level of radiant energy of a second wavelength lambda$_2$, and further comprising:

(a) first wavelength selective beam splitter/combiner means at a first end of the fiber optic pathway means and having a wavelength lambda$_1$ input first port, a wavelength lambda$_2$ input/output second port, and a combined wavelength lambda$_1$ output and lambda$_2$ input/output third port, said beam splitter/combiner being adapted for reception of variable-power radiant energy at wavelength lambda$_1$ from the variable power source at the first port and for reception of the steady level radiant energy at wavelength lambda$_2$ from the steady power source at the second port and for reception of a varying level radiant energy at wavelength lambda$_2$ at the third port, and for outputting the combined variable power radiant energy at wavelength lambda$_1$ and the steady power radiant energy at wavelength lambda$_2$ at the third port and for outputting the varying level radiant energy at wavelength lambda$_2$ at the second port; and (b) second wavelength selective beam splitter/combiner means at the second end of the fiber optic pathway means having a wavelength lambda$_2$ input/output first port, a wavelength lambda$_1$ output second port, and a wavelength lambda$_1$ input and wavelength lambda$_2$ input/output third port, said beam splitter/combiner being adapted for reception of the variable power radiant energy at wavelength lambda$_1$ and for reception of the steady power radiant energy at wavelength lambda$_2$ from the fiber optic pathway means at the third port and for communicating the wavelength lamdba$_1$ energy to the first power transducer via the second port and the wavelength lambda$_2$ energy to the reflection means associated with the oscillating element via the first port, and for receiving the periodic reflections of the lambda$_2$ energy returned from the reflection means at the first port and directing same to the third port output.

7. In an instrumentation system of the type wherein a physical parameter or measurand is to be measured by a sensor at a sensor site and the resultant measurement value communicated to a remote central station, said sensor having an electromagnetically driven resonant element the resonant frequency of vibration of which is responsive to a physical parameter such as force, temperature, pressure, flow, or liquid level, said resonant frequency varying in relation to said physical parameter, improved apparatus for determining said resonant frequency by fiber optic means comprising:

(a) first photoelectric transducer means at the sensor site for powering the resonant element into oscillation;

(b) first remote radiant energy source means located at the remote central station, for supplying variable power radiant energy;

(c) oscillator feedback network means connected to said first remote radiant energy source means located at the remote central station, for sustaining an oscillatory control output;

(d) first fiber optic pathway means for communicating radiant energy to said first photoelectric transducer means from the first remote radiant energy source means;

(e) second radiant energy source means disposed between the sensor site and the feedback network, and located at the remote central station for supplying steady-state radiant energy;

(f) the electromagnetically driven resonant element including a reflective portion thereof for periodic reflection of steady-state radiant energy;

(g) second fiber optic pathway means having first and second ends, terminated at its first end adjacent the reflective portion of the resonant element and terminated at its second end at the remote central station, for communicating steady-state radiant energy to said resonant element and for communicating reflections of portions of such radiant energy from the resonant element reflective surface to the second end of said fiber optic pathway means at the remote central station;

(h) radiant energy beam splitter/combiner means having a directional input port, a directional output port, and a bidirectional input/output port connected to the second end of said second fiber optic pathway means, the directional input port of said beam splitter/combiner being adapted for receiving radiant energy from the second remote radiant energy source means and for directing same to the input/output port, and the directional output port of said beam splitter/combiner being adapted from receiving radiant energy from the input/output port;

(i) second photoelectric transducer means for receiving radiant energy from the beam splitter/combiner directional output port, and for converting said periodic radiant energy reflections into a varying electrical output signal, the power of which varies in relation to the resonant oscillations of said sensor resonant element;

(j) means to connect the electrical output from said second photoelectric transducer means to said feedback network for sustaining oscillation of the resonant element; and (k) output means for deriving at the remote central station an electrical signal related to the frequency of vibration of said resonant element.

8. The apparatus of claim 7 wherein said first remote radiant energy source means produces a series of regularly recurrent impulses of radiant energy.

9. The apparatus of claim 7 wherein said feedback network further includes:

a phase shift network to receive said second photoelectric transducer output signal and adjust the phase thereof to compensate for phase differences between said signal and the first transducer output, and an output signal for sustaining the resonant frequency element oscillations.

* * * * *